United States Patent
Thorson et al.

(10) Patent No.: US 6,227,087 B1
(45) Date of Patent: *May 8, 2001

(54) LIQUID JET CUTTER FOR CUTTING A ROLLED DOUGH PRODUCT

(75) Inventors: James S. Thorson, Scandia; Cheryl L. Mitchell, Maple Grove; Lochi D. Munasinghe, Forest Lake, all of MN (US)

(73) Assignee: The Pillsbury Company, Minneapolis, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,078

(22) Filed: Apr. 14, 1997

Related U.S. Application Data

(63) Continuation of application No. 08/482,370, filed on Jun. 7, 1995, now abandoned.

(51) Int. Cl.⁷ .............................. A21C 5/00; B26D 7/06; B26F 3/00
(52) U.S. Cl. ............................. 83/109; 83/155.1; 83/177; 83/448; 83/932; 425/312
(58) Field of Search .................... 83/177, 932, 155.1, 83/157, 79, 109, 111, 112, 448; 425/308, 312, 315; 426/503, 518; 264/148

(56) References Cited

U.S. PATENT DOCUMENTS

| | | | |
|---|---|---|---|
| 3,205,739 | * 9/1965 | Meyer-Jagenberg | 83/79 X |
| 3,524,367 | 8/1970 | Franz | 83/53 |
| 3,759,126 | * 9/1973 | Burgess | 83/157 X |
| 3,891,157 | 6/1975 | Justus | 242/56.2 |
| 4,246,838 | * 1/1981 | Pulver et al. | 83/177 X |
| 4,332,538 | * 6/1982 | Campbell | 425/308 X |
| 4,459,093 | * 7/1984 | Asano | 264/148 X |
| 4,492,553 | * 1/1985 | Giulio et al. | 425/308 |
| 4,526,795 | 7/1985 | Wolf . | |
| 4,692,109 | * 9/1987 | Hayashi et al. | 425/308 |
| 4,735,566 | * 4/1988 | Squicciarini | 425/312 |
| 4,740,149 | * 4/1988 | Kristensen | 425/308 |
| 4,847,954 | * 7/1989 | Lapeyre et al. | 83/177 X |
| 4,916,992 | * 4/1990 | Nasu | 83/177 X |
| 5,077,074 | * 12/1991 | Van Lengerich | 426/518 X |
| 5,290,577 | * 3/1994 | Tashiro | 425/308 X |

FOREIGN PATENT DOCUMENTS

| | | | |
|---|---|---|---|
| 1187736 | 5/1985 | (CA) . | |
| 2550478 | * 5/1977 | (DE) | 83/157 |
| WO 95/05746 | 3/1985 | (DK) . | |
| 233008A1 | * 8/1987 | (EP) | 83/109 |
| 2 601 231 | 7/1989 | (FR) . | |
| 2647049 | * 11/1990 | (FR) | 83/177 |
| WO 93/06010 | 4/1993 | (FR) . | |

OTHER PUBLICATIONS

"Hochdruckwasserstrahl als Schneidwerkzeug fur dreidimensionale Bearbeitung", by H. Murau, *Werkstattstechni*, Feb., 1990, No. Berling, DE, pp. 99–101.

* cited by examiner

*Primary Examiner*—Charles Goodman
(74) *Attorney, Agent, or Firm*—Kagan, Binder, PLLC

(57) ABSTRACT

A cutting apparatus cuts a rolled dough product. The apparatus includes a conveyor conveying a rolled dough cylinder along a dough travel path. A nozzle is coupled to a liquid source providing liquid under pressure and is directed toward the dough travel path. The nozzle is offset from a surface of the dough cylinder by an offset distance sufficient so the cutter can cut a portion from the dough cylinder and provide sufficient separation between the cut portion and the dough cylinder so the cut portion does not stick to the dough cylinder.

8 Claims, 2 Drawing Sheets

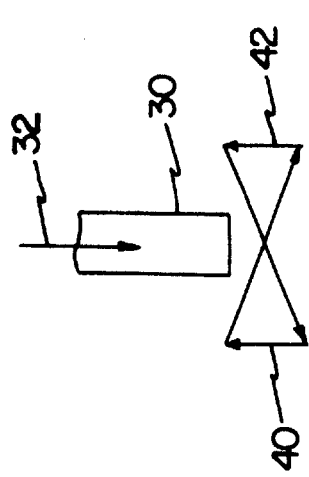
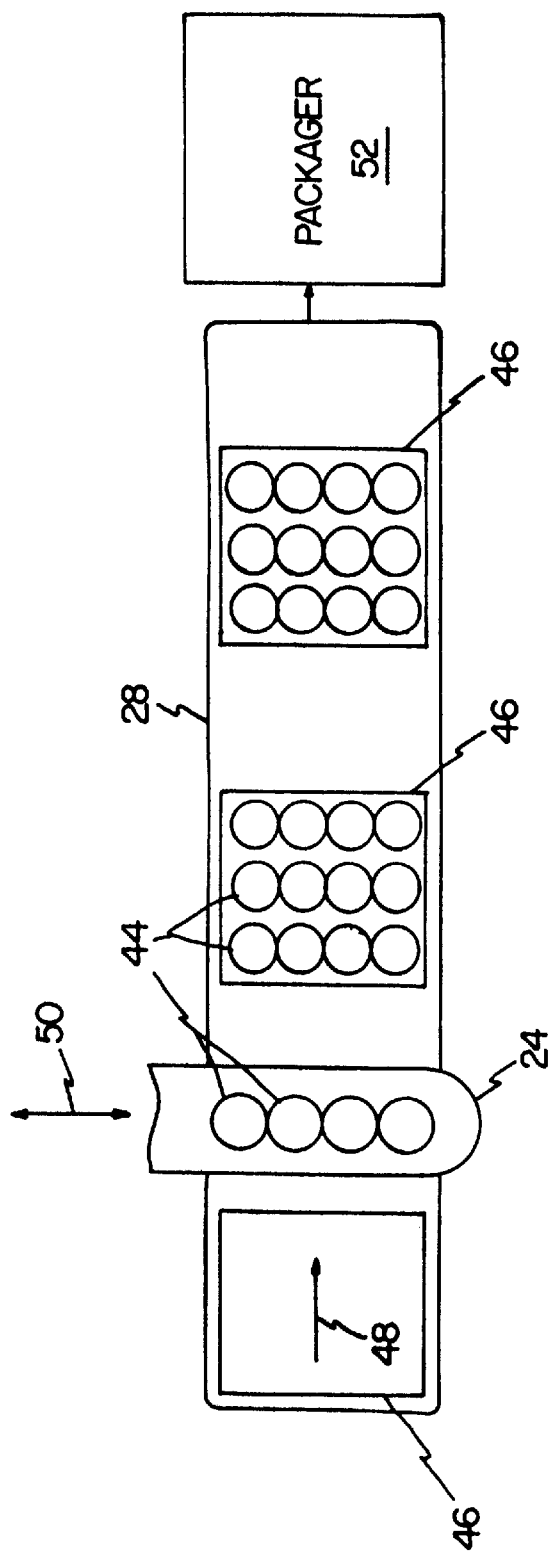

LIQUID JET CUTTER FOR CUTTING A ROLLED DOUGH PRODUCT

The present application is continuation of U.S. patent application Ser. No. 08/482,370, filed Jun 7, 1995, now abandoned.

BACKGROUND OF THE INVENTION

The present invention relates to rolled dough products. More particularly, the present invention relates to an apparatus for cutting dough pieces from a rolled dough product in a dough processing line.

Food processing equipment, such as dough processors, are known. Similarly, conventional equipment exists for forming a rolled dough product. Such equipment typically provides a sheet of dough on a conveyor. Filling is applied to the sheet of dough and the dough is rolled with rolling equipment, such as Torpedo rollers. The rolled dough is provided as a continuous rolled dough cylinder, to a cutting apparatus which cuts the rolled dough cylinder to form a plurality of rolled dough pieces, each of which has filling rolled therein. The individual rolled dough pieces are then passed on to additional processing steps or are provided to a packaging apparatus which packages the rolled dough pieces in cans or other suitable packages.

Conventional cutting machines have included guillotine-type cutters. This type of cutter has a knife which is moved in a reciprocating manner as the dough cylinder travels beneath the knife. The knife cuts the dough into individual rolled dough pieces which are moved by an outfeed conveyor to the packaging machine.

The guillotine-type cutting apparatus is not suitable for use with many rolled dough products. The rolled dough products are simply too soft. The guillotine-type cutter smashes or crushes the dough pieces so that they are not easily packagable, and so that they are not easily used for their intended purposes. For instance, many such rolled dough products are intended to be put in a common household toaster. If they are crushed into irregular shapes, they tend to thicken and do not fit in such a toaster. In addition, guillotine-type cutters can tend to cause the cut dough pieces to be displaced on the take away conveyor. This requires manual handling or manipulation of the dough products to properly reposition them on the take away conveyor. However, since the dough products are so soft, manual handling of the dough products is very difficult, or impossible, if certain physical integrity of the dough product is to be maintained.

Further, in conventional dough processing equipment, the dough is moved continuously as it is cut. This can result in the dough pieces cut from the cylinder being wedge-shaped. In other words, since the dough is moving continuously, the guillotine cutter essentially cuts at an angle across the cylinder of dough resulting in a wedge-shaped piece. This wedge-shaped piece can present problems in packaging.

Also, in some conventional dough processing equipment, the guillotine cuts the dough on a flat, substantially horizontal surface (although some guillotine cutters cut horizontally). Thus, after the dough is cut into individual pieces, the pieces do not always lay down flat on the outfeed (or take away) conveyor. This can also cause problems during packaging. If the dough products are not lying flat on the outfeed conveyor, they must be manually repositioned on the conveyor so that they are lying flat. As discussed previously, this manual handling is undesirable.

SUMMARY OF THE INVENTION

A cutting apparatus cuts a rolled dough product. The apparatus includes a conveyor conveying a rolled dough cylinder along a dough travel path. A nozzle is coupled to a liquid source providing liquid under pressure and is directed toward the dough travel path. The nozzle is offset from a surface of the dough cylinder by an offset distance sufficient so the nozzle can direct liquid at the dough cylinder to cut a portion from the dough cylinder and still provide sufficient separation between the cut portion and the dough cylinder so the cut portion does not stick to the dough cylinder.

BRIEF DESCRIPTION OF THE DRAWINGS

FIG. 1A illustrates one embodiment of a cutting path for the cutter according to the present invention.

FIG. 2 is a top view of a portion of the dough handling system shown in FIG. 1.

DETAILED DESCRIPTION OF THE PREFERRED EMBODIMENTS

Figure 1:
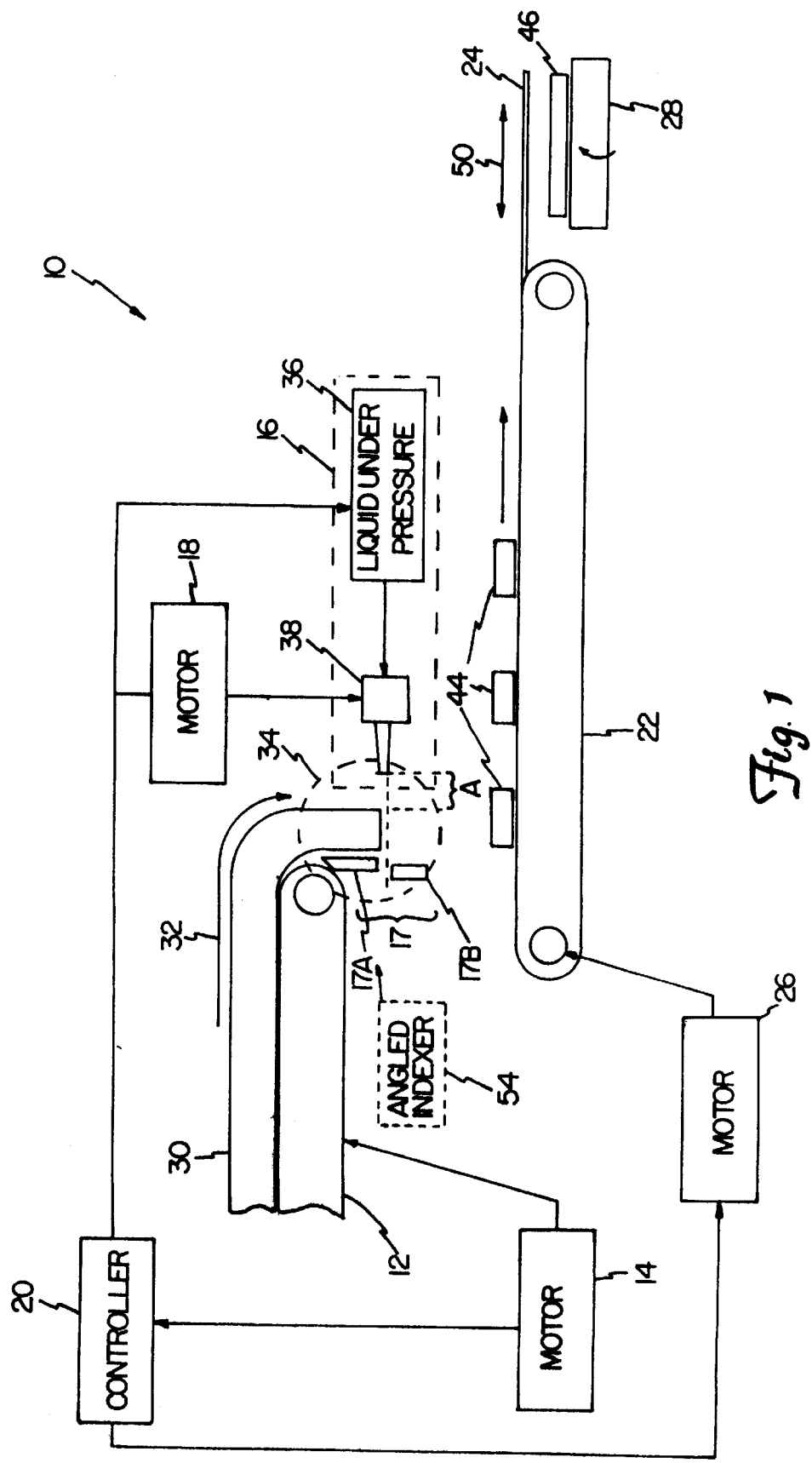
FIG. 1 is a side view of a dough handling system according to the present invention, shown in partial block diagram form.

FIG. 1 shows a dough handling system 10 in partial block diagram form. Dough handling system 10 includes conveyor 12, conveyor motor 14, liquid jet cutter 16, backing piece 17, cutter motor 18, controller 20, take away conveyor 22, retracting nose bar 24, take away conveyor motor 26 and pan conveyor 28.

Dough cylinder 30 is provided by a preparation table portion of the dough handling line. The preparation table portion varies depending on the particular type of the dough product being prepared. However, the preparation table portion of dough processing line may include dough extrusion and reduction equipment, which extrudes and reduces the dough to a desired thickness in a desired number of layers to form a dough sheet. The preparation table portion of the dough processing line also typically includes a filling portion which applies filling to the dough sheet, and a rolling portion which rolls the dough into cylinder 30. The rolling portion is typically formed of known rolling equipment, such as torpedo rollers. The torpedo rollers provide dough cylinder 30 (with filling rolled therein) to conveyor 12.

Conveyor 12 moves dough cylinder 30 along a dough travel path generally indicated by arrow 32. In one embodiment of the present invention, dough cylinder 30 moves along conveyor 12 and then drapes over conveyor 12 to assume a substantially vertical position in a cutting region 34.

Liquid jet cutter 16 is preferably a suitable, commercially available water jet cutting device, such as one manufactured by the Flow International Company. The liquid jet cutter 16 typically includes a liquid source 36 providing liquid under pressure to a nozzle assembly 38. Liquid jet cutter 16 is preferably mounted on slides (such as linear slides or a dovetail way) and driven by a motor 18, along the slides, along a cutting path generally transverse to the dough travel path 32. Nozzle assembly 38 of cutter 16 directs a stream of the pressurized liquid at dough cylinder 30 to cut dough cylinder 30 as cutter 16 moves along the cutting path.

It should be noted that, by generally transverse, it is meant that the nozzle assembly 38 can be moved directly transversely to the dough travel path, or in a motion indicated generally by FIG. 1A. Dough cylinder 30 is commonly moving continuously. In order to have cuts across dough cylinder 30 which are substantially perpendicular to the dough travel path, cutter 16 must first be driven in a direction indicated by one of arrows 40 and 42 in FIG. 1A. Then, the cutter 16 is driven across the dough cylinder 30 in a direction which is angled relative to dough cylinder 30. Since dough cylinder 30 is continuously moving, this angled cross-cut motion of liquid jet cutter 16 provides essentially a cut which is perpendicular to the dough travel path.

Once liquid jet cutter 16 has cut a dough piece 44 from dough cylinder 30, the dough piece 44 falls on take away conveyor 22. Take away conveyor 22 conveys the cut dough pieces 44 onto retracting nose bar 24. Retracting nose bar 24 is commercially available and operates in a known manner. Retracting nose bar 24 essentially accumulates a plurality of cut dough pieces 44 and then retracts quickly allowing the dough pieces 44 to fall into a pan, such as pan 46, supported by pan conveyor 28. The pans are then either continuously moved, or indexed, forward and additional dough pieces 44 are placed in the pans until they are full.

This is better illustrated in FIG. 2. As pans 46 advance in a direction generally indicated by arrow 48 on conveyor 28, they move beneath retracting nose bar 24. Once retracting nose bar 24 accumulates a plurality of dough pieces 44, it retracts quickly allowing the dough pieces 44 to fall into a pan 46 located below retracting nose bar 24. Thus, retracting nose bar 24 essentially moves in a reciprocating direction generally indicated by arrow 50. Once the pans 46 are full, they are conveyed by conveyor 28 to a packager 52 which can be any suitable, commercially available packaging equipment, or other suitable packager.

In the preferred embodiment, conveyor 12 is driven by motor 14, conveyor 22 is driven by motor 26, and liquid jet cutter 16 is driven by motor 18. All of these motors are preferably coupled to controller 20 which is a digital computer, a microcontroller, or other suitable electronic controller. Controller 20 preferably receives an input from motor 14 indicating the speed at which motor 14 is travelling. In response to that speed signal, controller 20 controls motor 18 to cause cutter 16 to make a desired number of cuts per minute so that dough pieces 44 of a desired thickness are obtained. However, it should also be noted that conveyors 12 and 22 and cutter 16 can be mechanically linked or electrically hardwired to operate without controller 20. Also, through the use of appropriate gear boxes, and linkages, only a single motor need be used to drive the entire system.

The nozzle of liquid jet cutter 16 is preferably offset from dough cylinder 30 by an offset distance A. It has been conventional wisdom that, the closer the nozzle of liquid jet cutter 16 is to dough cylinder 30, the better cutting performance would be obtained. However, applicants have found that, if liquid jet cutter 16 is placed such that the nozzle is too close to dough cylinder 30, then cutter 16 would certainly cut dough 30, but the cut is so thin, and provides such little separation between the cut dough piece 44 and the end of cylinder 30 that the surface tension of the water (or other liquid used to cut the dough) causes the cut dough piece 44 to stick to, or become "glued" to the end of dough cylinder 30.

Since it is extremely undesirable to manually handle the soft dough pieces (because they lose physical integrity), it is highly desirable that the dough pieces 44 separate from cylinder 30 once they are cut. It has been found that the offset distance A between the nozzle of cutter 16 and dough cylinder 30 should be in excess of 0.75 inches, and preferably in a range of approximately 0.75 inches to 2.5 inches. Exceptional results have been observed with the offset distance A in a range of approximately 1.5 inches to 2.0 inches in order to cut a dough piece 44 having a thickness in a range of approximately 0.25 inches to 1.0 inch.

The nozzle of cutter 16 preferably has an inner diameter which can be selected based on desired cut quality. It has been found that acceptable cutting results are achieved using a nozzle having an inner diameter in a range of 0.07 inches to 0.08 inches. The nozzle with a 0.07 inch inner diameter is desirable because it uses less cutting liquid. However, satisfactory results can be obtained using nozzles having an inner diameter in a range of approximately 0.05 inches to 0.10 inches.

The liquid under pressure provided to nozzle assembly 38 can be provided at any suitable pressure. Suitable results have been obtained using pressures of between approximately 20,000 lbs. per square inch (psi) and 55,000 psi. Pressures in excess of 55,000 psi can be used as well.

It should also be noted that the speed at which cutter 16 is driven along the cutting path (i.e. substantially transverse to the dough travel path) is preferably in a range of approximately loo inches per minute to 1,200 inches per minute, and even more preferably in excess of 200 inches per minute. However, any suitable cutting speed can be used.

While water is a preferred cutting liquid, any other suitable liquid can be used, such as oil, salt water or sugar water. The temperature at which the cutting liquid is provided to the nozzle assembly 38 of cutter 16 can range from approximately room temperature (or even cooler) to a temperature just below the boiling point of the liquid.

Further, it has been found that cutting using a water jet cutter, and cutting extremely soft products, such as rolled dough products, can cause the dough to "blow out" on the back of cylinder 30 (opposite cutter 16). Therefore, backing assembly 17 is provided. Backing assembly 17 preferably includes a first backing piece 17A and a second backing piece 17B. Backing piece 17A has a dough supporting surface which is substantially flush with the surface of conveyor 12, while backing piece 17B has a dough supporting surface which is offset slightly (i.e. 0.10 inches) in a direction away from dough cylinder 30. In this way, as dough cylinder 30 advances, no portion of dough cylinder 30 or dough pieces 44 catch on backing piece 17B. It should also be noted that there is preferably a small gap between backing pieces 17A and 17B such that the liquid used to cut cylinder 30 passes through the gap to eliminate back splash against dough cylinder 30 and dough pieces 44. Backing assembly 17 is preferably formed of stainless steel but can also be formed of a suitable plastic material, such as polypropylene.

In addition, angled indexer 54 can be used in conveyor system 10. Angled indexer 54 is described in greater detail in co-pending U.S. patent application Ser. No. 08/461,303 Jun. 5, 1995, and entitled AN INDEXER FOR MOVING FOOD ALONG A PROCESSING LINE IN A PRECISE MANNER, and assigned to the same assignee as the present invention, hereby incorporated by reference.

Briefly, angled indexer 54 transports dough cylinder 30 at approximately a 45 degree angle (relative to vertical) toward cutter 16. The angled indexer 54 has movable support members (such as belts), which support dough cylinder 30 as it moves along the angled decent to cutter 16. Angled indexer 54 also has a pair of clamping members disposed just prior to cutting member 16 along the dough travel path. The indexer intermittently moves dough cylinder 30 forward along the dough travel path, and during dwell time periods between intermittent moves, the clamping members clamp dough cylinder 30 to hold it securely during the cutting operation. Angled indexer 54 is also preferably coupled to controller 20 so that all of the conveyors and motors are controlled at complimentary speeds.

Although the present invention has been described with reference to preferred embodiments, workers skilled in the art will recognize that changes may be made in form and detail without departing from the spirit and scope of the invention.

What is claimed is:

1. A handling apparatus for handling a rolled dough product, the handling apparatus comprising:

a conveyor conveying a rolled dough cylinder into a dough travel path having a substantially vertical orientation so that a portion of the dough cylinder is suspended relative to the conveyor;

a nozzle coupled to a liquid source providing liquid under pressure, the nozzle being movable relative to, and directed toward, the dough travel path and being offset in a first direction from a substantially vertical surface of the dough cylinder by an offset distance sufficient so that when the nozzle directs the fluid under pressure toward the dough cylinder, the fluid forms a substantially horizontal cut which cuts a portion from the dough cylinder and provides sufficient separation between the cut portion and the dough cylinder so the cut portion falls from the dough cylinder and does not stick to the dough cylinder;

a backing assembly disposed on a side of the dough cylinder opposite the nozzle to support the dough cylinder during cutting;

wherein the nozzle is spaced from the dough cylinder in the first direction and wherein the backing assembly comprises:

a first dough supporting backing piece having a backing surface disposed substantially flush with a dough supporting surface of the conveyor; and a second backing piece, spaced from the first dough supporting backing piece in direction along the dough travel path, and having a backing surface lying in a plane, at least a portion of said plane being offset in a second direction, opposite the first direction, from the backing surface of the first dough supporting backing piece.

2. The handling apparatus of claim 1 wherein the offset distance is at least approximately 0.75 inches.

3. The handling apparatus of claim 1 wherein the offset distance is in a range of approximately 0.75 inches to 2.5 inches.

4. The handling apparatus of claim 3 wherein the offset distance is in a range of approximately 1.5 inches to 2.0 inches.

5. The handling apparatus of claim 1 wherein the nozzle has an inner diameter in a range of approximately 0.05 inches to 0.10 inches.

6. The handling apparatus of claim 5 wherein the inner diameter of the nozzle is in a range of approximately 0.07 inches to 0.08 inches.

7. The handling apparatus of claim 1 and further including:

a pan loading apparatus coupled relative to the nozzle to receive the cut portion and load a plurality of cut portions into a pan.

8. The handling apparatus of claim 1 wherein the nozzle expels the liquid under pressure at a pressure of at least approximately 20,000 lbs per square inch (psi).

* * * * *